United States Patent
Li et al.

(10) Patent No.: US 11,094,111 B2
(45) Date of Patent: Aug. 17, 2021

(54) PROGRESSIVE PHOTON MAPPING METHOD EMPLOYING STATISTICAL MODEL TEST

(71) Applicant: Peking University, Beijing (CN)

(72) Inventors: Sheng Li, Beijing (CN); Zehui Lin, Beijing (CN); Xinlu Zeng, Beijing (CN); Guoping Wang, Beijing (CN)

(73) Assignee: Peking University, Beijing (CN)

( * ) Notice: Subject to any disclaimer, the term of this patent is extended or adjusted under 35 U.S.C. 154(b) by 0 days.

(21) Appl. No.: 17/041,650

(22) PCT Filed: Mar. 30, 2018

(86) PCT No.: PCT/CN2018/081415
§ 371 (c)(1),
(2) Date: Sep. 25, 2020

(87) PCT Pub. No.: WO2019/183949
PCT Pub. Date: Oct. 3, 2019

(65) Prior Publication Data
US 2021/0118222 A1    Apr. 22, 2021

(30) Foreign Application Priority Data
Mar. 27, 2018    (CN) .......................... 201810257307.8

(51) Int. Cl.
*G06T 15/50*    (2011.01)
*G06T 15/06*    (2011.01)

(52) U.S. Cl.
CPC ............ *G06T 15/506* (2013.01); *G06T 15/06* (2013.01); *G06T 2210/56* (2013.01)

(58) Field of Classification Search
None
See application file for complete search history.

(56) References Cited

U.S. PATENT DOCUMENTS 8,638,331 B1 *    1/2014    Jarosz ..................... G06T 15/06
                                                          345/426
9,013,484 B1 *    4/2015    Jakob ...................... G06T 15/06
                                                          345/426

(Continued)

OTHER PUBLICATIONS

NPL search history. (Year: 2021).*

*Primary Examiner* — Nurun N Flora
(74) *Attorney, Agent, or Firm* — SV Patent Service

(57) ABSTRACT

A progressive photon mapping method based on statistical test includes launching rays from the viewpoint to each pixel on the image plane and intersecting the three-dimensional scene to be rendered. If an intersection with diffuse surface is found on the tracing path, it is recorded as the hit point; a photon pass is performed: 31) performing photon tracing step; 32) performing photon collection processing for each hit point; 33) if the current iteration of photon pass does not need chi-square test, then performing flux accumulation and keeping the collection radius unchanged; if chi-square is required, evaluating the photon distribution quality; computing a collection radius according to the estimated photon distribution, and performing the flux accumulation in the current photon pass; 34) if the photon collection radius is reduced, then performing distributed ray tracing, generating new hit points, and go to 31), otherwise go to 31), start a new iteration of photon pass.

7 Claims, 2 Drawing Sheets

(56) References Cited

U.S. PATENT DOCUMENTS

| | | | | |
|---|---|---|---|---|
| 9,684,991 B2* | 6/2017 | Ha | ......................... | G06T 15/506 |
| 2014/0204087 A1* | 7/2014 | Habel | ................... | G06T 15/506 |
| | | | | 345/426 |
| 2017/0345208 A1* | 11/2017 | Ashdown | ............... | H05B 47/11 |
| 2017/0352181 A1* | 12/2017 | Vetter | ................... | G06T 17/005 |
| 2018/0018814 A1* | 1/2018 | Dahm | ................... | G06T 15/506 |
| 2018/0040155 A1* | 2/2018 | Lecgcg | ................... | G06T 7/277 |

* cited by examiner

PROGRESSIVE PHOTON MAPPING METHOD EMPLOYING STATISTICAL MODEL TEST

FIELD OF THE INVENTION

This invention relates to a progressive photon mapping method, in particular to a progressive photon mapping method based on statistical model test, in the fields of computer software technology, computer graphics, and high-fidelity realistic rendering.

BACKGROUND OF THE INVENTION

Global illumination is the core of realistic rendering technique, and it is also one of the classic problems in computer graphics. In recent years, a large number of algorithms have been used to solve this problem. Simulating global illumination by solving a rendering equation is the theoretical basis, and ray tracing based on Monte Carlo sampling is one of the most popular methods (Philip Dutre, Philippe Bekaert, and Kavita Bala. 2016. Advanced global illumination. A K Peters Ltd.). Monte Carl ray tracing is an unbiased method that can solve the rendering equation by constructing a ray path starting from the camera (eye). Since the eye path starting from the camera must reach the light source probabilistically in order to produce caustics, ray tracing in a scene with small light sources and specular materials is not robust enough.

Bidirectional path tracing (BDPT) can avoid this problem by constructing a path both from the camera and a path emitting from the light source, respectively. If the path from the light source reaches the diffuse surface, the bidirectional path tracing directly connects the hit point with the camera in order to calculate the contribution to the image, thereby can deal with the contribution from the small light source effectively. However, BDPT still cannot simulate caustic resultant from specular reflection and refraction correctly. Another major problem of ray tracing is that a large number of light samples are needed to produce convergence of illumination and obtain visually satisfactory images. In 2014, Bochang proposed a new adaptive sampling and reconstruction method on screen space based on local regression theory. This was a novel process of local space estimation, by robustly processing high-dimensional noise features, using local regression method to render visually satisfactory images (Moon, Bochang, Nathan Carr, and Sung-Eui Yoon. "Adaptive rendering based on weighted local regression" ACM Transactions on Graphics (TOG) 33.5 (2014): 170).

When rendering a large and complex scene, it often happens that the light travels through complex paths to reach the observer's eyes (camera). In this case, traditional stochastic algorithms, such as the ray tracing algorithms, will be difficult to synthesize noise-free images. In 2015, Venceslas proposed to use a ray tracing algorithm based on scene skeleton sampling (Noël, Laurent, and Venceslas Biri. "Skeleton based Vertex Connection Resampling for Bidirectional Path Tracing." Computer Graphics Forum. Vol. 34. No. 7. 2015). It only increases very little time cost while producing more accurate images.

Photon mapping (PM) can solve the rendering equation by simulating the propagation and distribution of energy through a large number of photons (Henrik Wann Jensen. 1996. Global illumination using photon maps. In Rendering Techniques' 96. Springer, 21-30). Photon mapping solves the rendering equation by estimating the density of photons, which is similar to bidirectional path tracing. Photon mapping includes two steps: emitting photons from the light source and then collecting the photons staying on the non-specular surface to construct a photon map; tracing the ray path from the camera, and estimating the radiance at the hit point based on the collected photon map in the first step. It can effectively solve the problem of specular reflection and refraction with caustics. However, photon mapping belongs to a class of biased algorithm, and its bias generally results from the limitation of the memory and the number of photons cannot approach infinity. Since photon mapping simulates global illumination by emitting a large number of photons, it will cause bias when the number of photons emitted is insufficient. Usually, when trying to increase the number of photons to solve this problem, it will bring a lot of time and storage consumption, but the bias removal is still not satisfactory.

Progressive photon mapping (PPM) can theoretically solve the bias problem and tends to alleviate the bias in synthetic benchmarks (Toshiya Hachisuka, Shinji Ogaki, and Henrik Wann Jensen. 2008. Progressive photon mapping, ACM Transactions on Graphics (TOG) 27, 5 (2008), 130). PPM generally launches multi-passes of photons and estimates the radiance using radius reduction in a progressive manner. In its first ray tracing pass of photon mapping, the algorithm sets an initial radius for each hit point $\vec{x}$. This method also proves that as long as the radius for photon collection shrinks with the increasing of the number of passes, and the radiance will eventually converge to a correct result.

Progressive photon mapping is the first progressive global illumination algorithm based on photon mapping. This algorithm theoretically solves the problem of the bias in photon mapping. It does not need to store all photons used for radiance estimation, and it can obtain better result with convergence than photon mapping. PPM is an improvement of photon mapping method. It uses photons accumulation and radius reduction to make the radiance gradually approach the true value without infinite memory requirement. Progressive photon mapping first performs an eye pass to trace the rays from the camera (eye) and record all hit points. It is followed by several photon passes to emit photons and collect photons, and update the radiance at the hit point.

As an extension to PPM, stochastic progressive photon mapping (SPPM) (Toshiya Hachisuka and Henrik Wann Jensen. 2009. Stochastic progressive photon mapping. ACM Transactions on Graphics (TOG) 28, 5 (2009), 141) makes it possible to compute the accurate average radiance value in a region using multiple distributed ray tracing passes. Both PPM and SPPM can be considered as the basis of a progressive scheme for photon mapping. PPM has also been extended to handle dynamic scenes (Maayan Weiss and Thorsten Grosch. 2012. Stochastic progressive photon mapping for dynamic scenes. Computer Graphics Forum 31, 2pt3 (2012), 719-726), it simultaneously subdivides geometry and traces photons in the system and distributes the workload on different machines in the cluster (Tobias Günther and Thorsten Grosch. 2014. Distributed Out-of-Core Stochastic Progressive Photon Mapping. Computer Graphics Forum 33, 6 (2014), 154-166).

Since bias and noise are unavoidable problems of the PM class methods, quantification of errors becomes extremely important. Kaplanyan introduced a local adaptive progressive photon mapping method (Anton S Kaplanyan and Carsten Dachsbacher 2013. Adaptive progressive photon mapping. ACM Transactions on Graphics (TOG) 32, 2 (2013), 16), which balances the noise and bias to minimize the total error. However, their methods cannot solve the visibility problems. For the Split-sphere model, Jorge et al. proposed an error metric for the irradiation cache, which is significantly better than the classic heuristic algorithm (Schwarzhaupt, J., Jensen, H W, & Jarosz, W. (2012). Practical hessian-based error control for irradiance caching. ACM Transactions on Graphics (TOG), 31(6), 193).

Although photon mapping methods usually perform well in processing complex light transportation paths, there is still a lot of redundant calculation wasted on processing those paths without any contribution to the final image. Therefore, in 2017, Adrien et al. focused on improving the sampling of photon path in density estimation. Therefore, an objective function of the Metropolis photon sampler is proposed, and the theoretical derivation of the objective function is given to guarantee that there are multiple estimators sharing a common set of samples (i.e. paths). An approximately equivalent relative error distribution, thereby improving the sampling efficiency of the path and reducing the noise of image rendered.

Principle of Chi-Square Test

Pearson's chi-square test, for simplicity, "chi-square test" is used as a shorthand for it. It corresponds to the statistical hypothesis test in which the distribution of the sampling statistic is a chi-square distribution when the null hypothesis is true. This test can be used to evaluate the goodness of fit of a discrete distribution with a hypothesis. The complete set of event groups $A_1, A_2, \ldots, A_k$, the null hypothesis is H0: $P(A_i)=p_i$, $i=1, 2, \ldots, k_0$. After performing N independent repeated experiments, and the frequency of occurrence of events are $O_1, O_2, \ldots, O_k$, then when $N \to \infty$, the chi-square test value $$V = \sum_{i=1}^{n} \frac{(O_i - Np_i)^2}{Np_i}$$

tends to be the $\chi2(k-1)$ distribution. The rejection domain of Pearson's chi-square test is $V > \chi_{1-\alpha}^2(k-1)$, i.e., $1-\alpha$ quantile of the chi-square distribution with $k-1$ degrees of freedom.

SUMMARY OF THE INVENTION

Progressive photon mapping method (PPM) often exhibits a progressive phenomenon during rendering: that is, the boundary of the illumination varies gradually from blur to clear during the progressive procedure. To a large extent, both the speed of this process and the quality of the final image synthesized depend on the initial radius for photon collection and radius shrinkage rate $\alpha_c$ ($0 < \alpha_c < 1$); with a large initial radius and a relatively large $\alpha_c$, the radius will shrink slowly, and the process of the illumination at boundary changing from blur to clear will be very slow as well; On the other hand, with a small initial radius or a relatively small $\alpha_c$, the radius will shrink too fast, the artifact on the image (noise) will become very obvious. To handle these problems mentioned above, the present disclosure proposes a new progressive radius convergence and photon accumulation method. By evaluating the distribution of photons within the collection radius associated with a hit point $\vec{x}$, the corresponding radius shrinking strategy and a radiance estimate method with convergence are adopted to reduce the bias caused by a large initial radius, and the speed of radius convergence can be controlled more intelligently.

The disclosed method proposes a new type of progressive photon mapping method. The sampling radius during photon collection adopts a new method, that is, the radius does not shrink in each iteration, but often keeps the radius unchanged. The radius reduction is performed only when certain conditions are satisfied for a test. However, the disclosed method still has convergence, and the convergence rate of radiance estimate is better than previous methods; at the same time, our method can save unnecessary distributed ray tracing steps (distributed ray tracing) in the tracing pass, thereby reducing time consumption and speeding up the rendering.

The present disclosure proposes a method for evaluating the quality of photon distribution using Chi-square test, i.e., using statistical methods to evaluate the quality of photon distribution, which can evaluate the goodness of fit between the photon distribution and the hypothetical theoretical distribution model. The disclosed method adopts uniform distribution as the hypothetical theoretical distribution. Based on the chi-square test result, our method shrinks the radius with convergence, and achieves radiance convergence in the progressive photon mapping.

The technical solution of the disclosed method is as follows:

A progressive photon mapping method based on statistical model test includes the following steps:

1) setting a photon number $k_{NN}$ used to determine the initial radius of photon collection, and set the number of photons emitted into the scene for each photon pass;

2) starting from the viewpoint, emitting a ray to each pixel to be calculated on the image plane and intersect with the 3D scene to be rendered; if an intersection point with the scene surface with the diffuse reflection properties is found on the tracing path, recording the intersection as a hit point $\vec{x}$; and 3) performing photon pass: 31) performing the photon tracing step, including simulating the light source emitting photons into the scene, tracing the propagation in the scene of each photon emitted by the current photon pass, and recording the photons that finally locate on the surface of the object along with the attributes of these photons, and constructing one or more photon maps based on these photons recorded; 32) for each hit point $\vec{x}$, performing photon collection processing, including collecting the photons in the neighbor from the photon map around the searching area where the hit point is located; 33) if the current photon pass does not need chi-square test, only performing flux accumulation and keeping the photon collection radius unchanged; if chi-square test is necessary, then performing chi-square test for the photons collected within the searching area associated with a hit point $\vec{x}$ to obtain the evaluation of its property; then determining a photon collection radius used in the next iteration of photon pass based on its property of the photon distribution, and performing flux accumulation of the current photon pass; and 34) determining whether the radius for photon collection will change or not; if the photon collection radius will be reduced, then generate a new hit point and perform distributed ray tracing, and then go to step 31) to start a new iteration with photon pass; otherwise, go directly to step 31) to start a new iteration with photon pass; among them, for each iteration, current round of rendering results can be obtained according to current accumulated flux for radiance estimation.

Further, various attributes of a photon include the energy carried by the photon, the spatial position where the photon stays, the incident angle when the photon is incident on the surface where it finally stays, and the BRDF of the surface.

Further, the distributed ray tracing method includes: starting from the viewpoint to each pixel to be calculated on the image plane, emitting a sample ray randomly passing through a pixel to intersect with the three-dimensional scene to be rendered; if an intersection point with diffuse reflection properties is found, setting the intersection as the newly generated hit point.

Further, the method of evaluating the photon distribution is:

41) assuming the collection radius for current round is $R_i$ associated with the hit point $\vec{x}$, partitioning the disk (i.e. searching area or collection area) into a series of concentric annuli, where the innermost sub-disk is a degenerate annulus with inner diameter equivalent to 0. These annuli constitute a series of concentric sub-disks from inside outwards. We partition each annulus further into N sectors, denoted as $(S_1, \ldots, S_N)$;

42) counting the number of photons locating on each sector, denoted as $(Photons(S_1), \ldots, Photons(S_N))$; and 43) performing the chi-square test on the number of photons falling into each sub-disk within the current circular photon collection area associated with the hit point $\vec{x}$ is performed from the inside to the outside; suppose a sub-disk C contains a total of Ns(C) sectors, denoted as $\{S_1, \ldots, S_{Ns(C)}\}$, the corresponding sector is labeled as $\{A_1, \ldots, A_{Ns(C)}\}$, and the number of photons falling in the corresponding sector is recorded as $\{Photons(S_1), \ldots, Photons(S_{Ns(C)})\}$, Nc is the total number of photons collected in the current photon pass within the sub-disk C, then the chi-square test of sub-disk C is calculated as $$V(C) = \sum_{i=1}^{Ns(C)} \frac{(Photons(S_i) - N_c p_i)^2}{N_c p_i},$$

where V(C) value represents the photon distribution, $p_i$ is the probability of a photon falling into the i-th sector among the Ns(C) sectors, $p_i = A_i/\pi r^2$, r is the radius of the current sub-disk C, and $Photons(S_i)$ is the number of photons falling into the i-th sector of these Ns(C) sectors; determining whether the photon distribution within the sub-disk C has passed the chi-square test or not according to the value of V(C).

Further, in the step 41), each disk is partitioned into several sectors with equal area.

Further, the step of computing the photon collection radius for the next iteration in the photon pass includes: for any sub-disk C from the inside to the outside, defining the quantile of the chi-square test of this disk Quantile(C)=λ, where λ satisfies $\chi_\lambda^2 (Ns(C)-1)=V(C)$, the sub-disk with the smallest value of λ is considered as the photon distribution within the sub-disk has the closest fit to the uniform distribution, and the corresponding radius is selected as the collection radius in the next iteration of photon pass, wherein Quantile(C) also represents the goodness of fit of the photon distribution in sub-disk C with the hypothetical distribution model.

Furthermore, the formula $$\tau_{i+1}(\vec{x}, \vec{\omega}) = (\tau_i(\vec{x}, \vec{\omega}) + \Phi_i(\vec{x}, \vec{\omega}))\frac{R_{i+1}(\vec{x})^2}{R_i(\vec{x})^2}$$

is used to calculate the flux accumulation of the (i+1)-th iteration of photon pass, where $R_{i+1}(\vec{x})$ is the radius of the photon collection in (i+1)-th iteration, $R_i(\vec{x})$ is the radius of the photon collection in i-th iteration, $\Phi_i(\vec{x}, \vec{\omega})$ is the flux of the photons collected in the i-th iteration, and $\tau_i(\vec{x}, \vec{\omega})$ is the flux accumulated before the i-th iteration with photon pass.

Compared with the conventional methods, the presently disclosed method includes one or more of following benefits:

Based on the progressive photon mapping framework, the current disclosure proposes a new and more intelligent convergence method based on statistical probability test. Progressive photon mapping is a robust global illumination algorithm that can calculate a radiance value at the hit point, and can handle complex illumination phenomena including the SDS (Specular Diffuse Specular) path of light transportation. However, in the past, progressive photon mapping (PPM) needed to manually set an initial radius empirically and a fixed radius convergence $\alpha_c$ value in advance when evaluating the radius, which was not universally applicable to general scenes, and the convergence rate is also slow, requiring a large number of iterations to converge to obtain a clear rendering result. The disclosed method can intelligently adjust the radius, greatly improve the speed of convergence, effectively reduce the bias caused by an excessively large initial radius, and quickly converge to obtain a clear image without increasing additional running time and memory overhead. At the same time, the disclosed method can also prevent the bias introduced from the drastic shrinkage of radius in one iteration step. Under the same MSE (mean square error) error metric, the disclosed method tends to speed up the convergence by 10 times compared with the SPPM method. That is to say, the rendering efficiency of our method is 10 times faster than that when the same rendering result is obtained using SPPM method. At the same time, the disclosed method can also intelligently tune and customize different convergence speeds according to the rendering quality required, so as to optimize the time for rendering a frame of image according to the visual effect.

DETAILED DESCRIPTION OF THE INVENTION

The present invention will now be described in further detail with reference to the accompanying figures.

Figure 1:
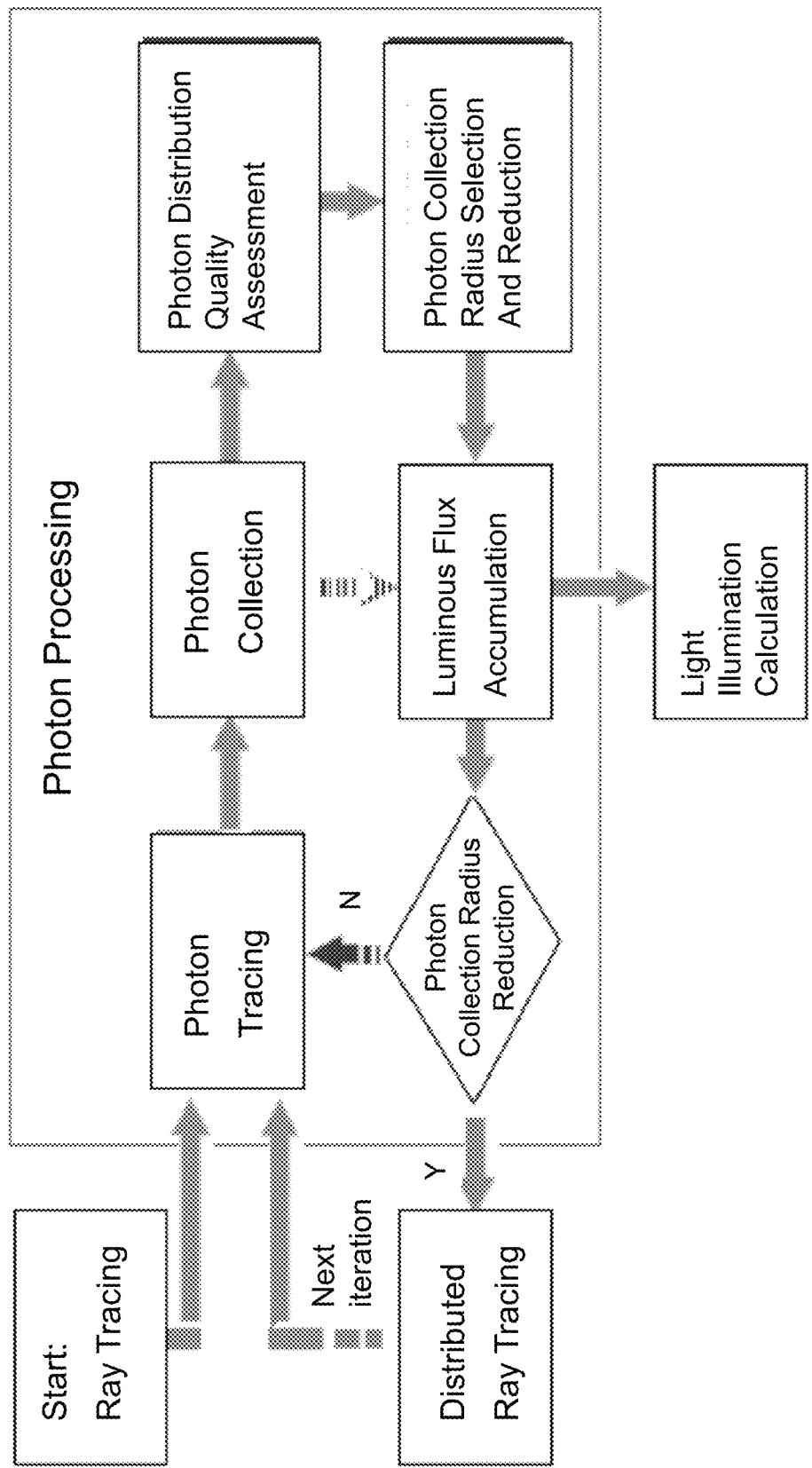
FIG. 1 is a workflow of the presently disclosed method.

FIG. 1 shows the workflow of the presently disclosed method, in which the dotted line indicates the different modules between our method and other methods.

The workflow of the presently disclosed method is shown in FIG. 1, which includes the following steps:

1. Setting some initial values of our method, including a $k_{NN}$ value, which can determine the initial radius of photon collection, that is, through the $K_{NN}$ (K-Nearest Neighbour) method to search and collect N photons. The radius covering $k_{NN}$ photons is used as the initial collection radius. In addition, the number of photons emitted to the scene in each round of photon pass is set; the number of photons generated in each round is the same, and Ne(i) is the total number of photons after i rounds of emission.

2. Executing the eye pass first, i.e. following the basic principle of ray tracing, start from the viewpoint to each pixel to be shaded on the image plane, then emit rays and intersect with the 3D scene, if an intersection point is found on the tracing path and the intersection point has diffuse attribute, this intersection point is recorded as a hit point $\vec{x}$;

3. Executing the photon processing step (photon pass for short), including the following sub-steps:

1) First performing the photon tracing step (photon tracing), that is, simulating the emission from the light source with a certain number of photons into the scene (the number is determined by the number of photons set in above step 1), tracing the process of all photons transportation in the scene, and recording those photons finally stay on the diffuse surface of the object. The attributes of each photon include the energy carried by the photon (i.e. flux), the position where the photon strikes, the incidence angle at which the photon enters the surface where it finally strikes, and BRDF, etc., and recording these photons using one or more photon maps (photon maps); and 2) For each hit point $\vec{x}$, performing photon collection, that is, collecting photons in the neighborhood of the surface where the hit point is located. This step is realized by searching in the photon map;

3) The chi-square test is not executed every iteration, but at a certain general interval. The specific interval value can be specified by the user or set by the algorithm. If chi-square test is not necessary for current iteration of photon pass, then skip directly to sub-step 6) to the module of flux accumulation stage, perform the flux accumulation by adding the flux carried by current photons to flux previously accumulated, and the collection radius does not shrink but remains unchanged under such condition; otherwise, it enters the next stage of chi-square test for photon distribution evaluation;

4) In the photon distribution evaluation stage, performing the quality evaluation on the photon distribution collected within the neighborhood associated with the hit point within a disk (corresponding to the distribution evaluation by Chi-square test), the specific evaluation methods and steps are described in the following description;

5) The collection radius (corresponding to bandwidth selection and reduction) in the next photon pass of the iteration is computed using to the properties of the photon distribution estimated, 6) Performing flux accumulation based on the collection radius, that is, accumulating together the flux carried by the photon currently located within the collection radius and the flux from the previous round;

7) Selecting the appropriate execution path according to whether the collection radius has been changed. If the collection radius is reduced, then go to the distributed ray tracing step, start from the viewpoint to each pixel to be shaded on the image plane, emitting sampled rays randomly and intersect the 3D scene to be rendered, if a diffuse intersection point is found, it is used as the newly generated hit point, and then go to the photon tracing step to start a new iteration of photon pass until the termination conditions are satisfied in a photon pass; otherwise, go directly to the photon tracing step and starts a new round of iterative photon pass (photon pass), that is, repeating the above process from step 1) until the termination conditions are satisfied; when the collection radius at a certain hit point does not change, the position of this hit point will not change either, i.e. using the same hit point from the previous round, and use the same radius in the new round to collect new photons. So there is not necessary to perform distributed ray tracing to generate new hit points. Only when the radius changes (i.e. shrinks), the distributed ray tracing is necessary to recalculate a new hit point.

8) The radiance value is obtained using illumination computation from the accumulated flux. Then computing the color of each pixel in the image at the corresponding position, and outputs the color of each pixel position to obtain a final rendered image. In each round of iterative process, the rendering result of the current round can be output through radiance estimation. After iterating sufficient rounds set by the user, the rendering result can be output, and the whole processing of our method completes.

The above steps describe the overall process of the disclosed method. Some of these steps are described in more detail below.

4. In the distributed ray tracing step, our method follows the same principle as the previous SPPM, and generates sampling points randomly for each pixel, so that the rays emitted from the viewpoint and try to intersect with the scene; for several sampling points within a region, use the same radius to collects photons, and estimates the irradiance value and the final illumination value. It has been proved that as long as the radiance estimate for one hit point is correct, the radiance estimate for multiple hit points is also correct.

Figure 2:
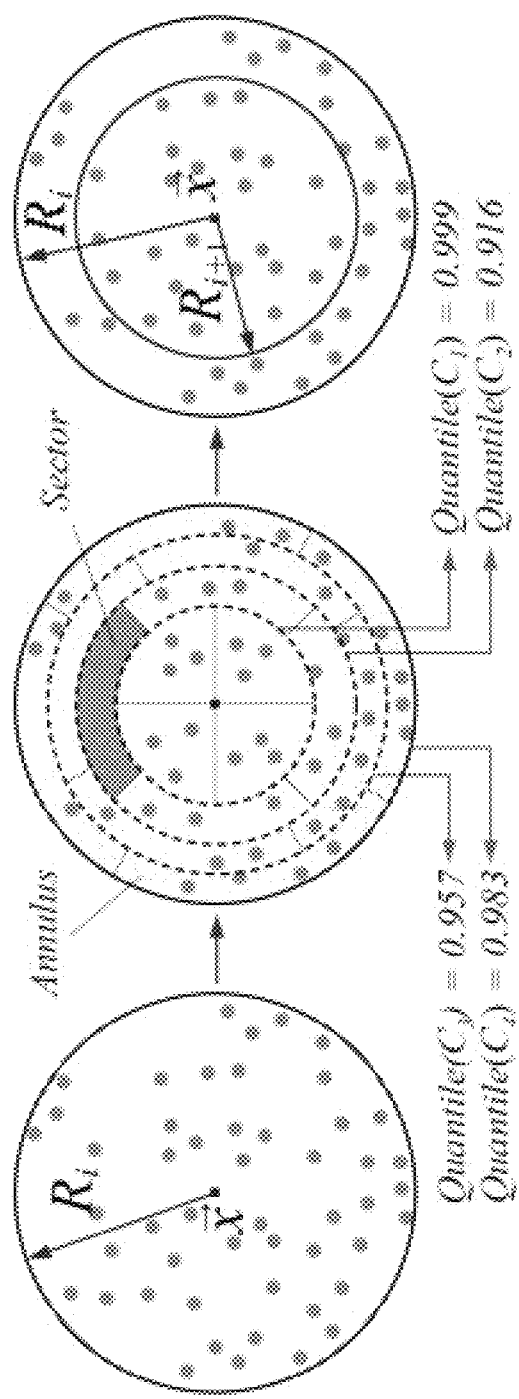
FIG. 2 is an illustration of searching area for photon collection and the process of radius shrinkage.

5. The detailed process of the photon distribution evaluation in the step 3.4) mentioned above is as follows:

1) For a disk-shaped photon collection area (as shown on the left side of FIG. 2, the hit point has a photon collection radius of $R_i$), partition the photon collection area into equal-area annulus (the inner diameter of the central annulus is 0), and each annulus is further partitioned into several sectors (the initial position of partition of each annulus into sectors is randomly set, and the splitting line between two adjacent annulus is often different), as shown in the middle of FIG. 2 is a schematic illustration of the partition of collection area into annuli and sectors. In order to determine whether the photon distribution in the collection area is close to the uniform distribution, the collection area can be randomly partitioned, as long as each sub-area is randomly generated. However, it is more convenient to partition the collection area into annuli and sectors, because there is no need to re-record the positions of all photons. After being partitioned, a number of nested sub-disks are generated from the inside to the outside of the disk. The smallest sub-disk is the innermost annulus, and the largest sub-disk is the entire disk (its radius is $R_i$). Noticing that if the radius associated with a hit point shrinks in the previous round, as shown on the right side of FIG. 2, this means that the collection area has changed accordingly, so the collection area needs to be re-partitioned according to the above rules on partition. For a hit point $\vec{x}$, partitioning its collection area into multiple annuli (the most central area is a small disk), and partition each annulus into multiple sectors, and the number of photons collected in each sector (photons (S)) reset to 0 at first; if the radius of the hit point did not shrink in the previous round, neither the circle nor the sector in the current round needs to be re-partitioned, just use the same area partitioned with the previous round.

2) Counting the number of photons locating on each sector. Specifically, suppose that there are N sectors in a disk, the sectors are labeled as $\{S_1, \ldots, S_N\}$, and the number of photons falling in each sector is counted as $\{Photons(S_1), \ldots, Photons(S_N)\}$.

3) The chi-square test on the number of photons falling into each sub-disk within the current circular photon collection area associated with the hit point is performed from the inside to the outside; suppose a sub-disk C contains a total of Ns(C) sectors, denoted as $\{S_1, \ldots, S_{Ns(C)}\}$, the corresponding sector is labeled as $\{A_1, \ldots, A_{Ns(C)}\}$ (in our method example, in order to facilitate the calculation, the area is set to be equal, but the area can be arbitrary in practice), and the number of photons falling in the corresponding sector is recorded as $\{Photons(S_1), \ldots, Photons(S_{Ns(C)})\}$, Nc is the total number of photons collected in the current photon pass within the sub-disk C, then the chi-square test of sub-disk C is calculated as $$V(C) = \sum_{i=1}^{Ns(C)} \frac{(Photons(S_i) - N_c p_i)^2}{N_c p_i},$$

where V(C) value represents the photon distribution, $p_i$ is the probability of a photon falling into the i-th sector among the Ns(C) sectors, $p_i = A_i/\pi r^2$, r is the radius of the current sub-disk C, and Photons(Si) is the number of photons falling into the i-th sector of these Ns(C) sectors. If $V(C) < (Ns(C)-1)$, where α is a constant with minimal value, 1−α represents the quantile of $\chi_{1-\alpha}^2(Ns(C)-1)$, then the photon distribution within the sub-disk C is considered to pass the chi-square test, and its photon distribution is of high quality; otherwise, it is deemed not passed the chi-square test, and its photon distribution is of low quality.

The details of the radius selection and shrinking steps in 3.5) are as follows:

1) If the photons on the entire disk (i.e. the outermost and largest sub-disk) pass the chi-square test, it means that the photon distribution on the disk is consistent with the assumption of uniform distribution, and the photon distribution is suitable to generate high-quality rendering conditions, the collection radius remains the same in the next iteration of photon pass;

2) Otherwise, the collection radius of the next photon pass should change. The basis for selecting the radius is as: for each sub-disk C from the inside to the outside, defining the quantile of the chi-square test of the sub-disk Quantile(C)=λ (where Quantile(C) is the goodness of fit between the photon distribution in sub-disk C and the hypothetical distribution model), where λ satisfies (Ns(C)−1)=V(C), then the sub-disk with the smallest λ value is considered to follow the uniform distribution of photons within this sub-disk (i.e., the hypothetical distribution model), so the radius of this sub-disk is selected as the collection radius for the photon pass in the next iteration.

The details of Step 5 on radiance estimation are as follows:

1) Assuming an i-th iteration of photon tracing step, the un-normalized flux $\Phi_i(\vec{x}, \vec{\omega})$ obtained by the photons collected associated to a hit point $\vec{x}$ in the current iteration is computed as follows:

$$\Phi_i(\vec{x}, \vec{\omega}) = \sum_{p=1}^{M_i(\vec{x})} f_r(\vec{x}, \vec{\omega}, \vec{\omega}_p)\Phi(\vec{x}, \vec{\omega}_p),$$

where $M_i(\vec{x})$ is the number of photons newly collected in the current iteration, $\vec{\omega}$ is the line of sight direction, $\vec{\omega}_p$ is the incident direction of a photon when it stays on the surface of a object, $f_r$ is the coefficient of the BRDF (bidirectional reflection distribution function) of the surface, and $\Phi_p$ is the flux carried by a photon p;

2) The newly accumulated flux r from the collected photons in current iteration and the flux accumulated in the previous iteration is calculated as follows:

$$\tau_{i+1}(\vec{x}, \vec{\omega}) = (\tau_i(\vec{x}, \vec{\omega}) + \Phi_i(\vec{x}, \vec{\omega}))\frac{R_{i+1}(\vec{x})^2}{R_i(\vec{x})^2},$$

where $R_i$ and $R_{i+1}$ represent the radius used for the i-th iteration of photon collection and the (i+1)-th iteration of photon collection, respectively; and 3) The final radiance L of a sampling point is as follows:

$$L(\vec{x}, \vec{\omega}) \approx \frac{\tau_i(\vec{x}, \vec{\omega})}{N_e(i)\pi R_i(\vec{x})^2},$$

where Ne(i) represents the total number of photons emitted after the i-th iteration emissions. The above-mentioned radiance value is the illumination, from which the color of a pixel corresponding to the sampling point can be computed out. After the color of each pixel is determined, the final color of the entire image is obtained.

The presently disclosed method can effectively employ appropriate processing strategy for different distribution of photons:

1) If the distribution of photons within the collection area associated with a hit point is close to a uniform distribution, then the collection radius is reduced slower, and more photons will be collected, which is beneficial to reduce the bias caused by the number of collected photons deviating from the true value in some rounds, and thus it will make the radiance change in a relatively smooth way. Usually, it is difficult for the human eye to distinguish the radiance of the center point and the average radiance in the collection area; and 2) If there is an obvious sudden change in the distribution of photons within the collection area associated with a hit point, when the radius is beyond the boundary of this sudden change, the collected photons will bring bias. The more photons collected, the greater the bias, so the radius should be reduced to within the boundary as soon as possible. One typical situation is at the boundary of caustics. The collection radius of a hit point near the boundary should be reduced as soon as possible until there is no intersection between the boundary of the caustics and the boundary of collection area. Otherwise, the collected photons may be too many or too few, resulting in bias or noise. Another typical situation is at the edge of geometry. PPM and SPPM general fail in this case, because the initial radius exceeds the edge of the geometry, the estimation of this area is incorrect, making the radiance near the edge too smaller than its correct value should be. At the same time, in a caustic scene, the human eye is more sensitive to boundary with large variation of shading. Using Chi-square test to identify this boundary indirectly can make the radius shrink slower in the former case and faster in the latter case. In this way, the radius at the boundary of the caustic spot in the scene and the boundary of the geometry will reduce more quickly and become clearly visible in a short time.

Since the disclosed method determines whether to shrink the radius by identifying whether the photons collected around the hit point are uniformly distributed, the algorithm of the disclosed method can quickly converge to a situation where the photons around the hit point subject to the uniform distribution, that is, the disclosed method can quickly compute a radius that can help obtain the final convergence value, which greatly accelerates the process of radius convergence. Another advantage of the disclosed method is that the speed of the radius convergence cannot be affected by the excessively-large initial radius. Because the initial radius is often set with a value much larger than it should be, generally, the larger the radius, the radiance farther away from the true value, the more difficult the distribution within the radius is considered as a uniform distribution. So no matter how large the initial radius is manually set, the disclosed method can quickly converge to the true illumination value.

The presently disclosed method accelerates the convergence of the progressive photon mapping method through a method of evaluating uniform distribution. Our method does not depend on the setting of the initial radius and can better control the convergence speed of the radius, so that the disclosed method can quickly get an accurate rendering result. At the same time, our invention has good convergence and is also applicable for integration in the SPPM framework. In comparison with the PPM/SPPM algorithm, the disclosed method is far more efficient in rendering the same results than these mainstream methods, especially in scenes with caustics, clearer boundary can be obtained quickly, so that the human vision sensitive boundary can be rendered more clearly, which can meets the visual needs of the human eyes.

The rendering results of the disclosed method (CPPM) are compared with that of SPPM. When the same number of emitted photons (5 billion) is used, that is, the same iterative number of passes is used, the effect of the disclosed method is significantly better than that of SPPM. The rendering effect using 5 billion photons is similar to that of SPPM using 50 billion photons, and is close to the final ground truth rendering result.

The benefits of the disclosed method can be demonstrated by comparing with conventional methods:

In Table 1, PPM (Toshiya Hachisuka, Shinji Ogaki, and Henrik Wann Jensen. 2008. Progressive photon 1503 mapping. ACM Transactions on Graphics (TOG) 27, 5 (2008), 130), SPPM (Toshiya Hachisuka and Henrik Wann Jensen. 2009. Stochastic progressive photon mapping. ACM Transactions on Graphics (TOG) 28, 5 (2009), 141), MSPPM (Adrien Gruson, Mickaël Ribardière, Martin Šik, Jiří Vorba, Rémi Cozot, Kadi Bouatouch, and Jaroslav Křivánek. 2016. A Spatial Target Function for Metropolis Photon Tracing. ACM Transactions on Graphics (TOG) 36, 1 (2016), 4), APPM (Anton S Kaplanyan and Carsten Dachsbacher. 2013. Adaptive progressive photon mapping. ACM Transactions on Graphics (TOG) 32, 2 (2013), 16) are the classical methods, while CPPM denotes our method.

TABLE 1

The results of the disclosed method in comparisons with 8 benchmark conventional methods.

| | | PPM | | SPPM | | MSPPM | | APPM | | CPPM | |
|---|---|---|---|---|---|---|---|---|---|---|---|
| Benchmark | MSE ≤ | Iterations | Time(s) | Iterations | Time(s) | Iterations | Time(s) | Iterations | Time(s) | Iterations | Time(s) |
| Box | 19 | 970 | 109.01 | 663 | 85.87 | 151 | 184.22 | 53 | 13.64 | 55 | 7.73 |
| Torus | 31 | 1037 | 80.91 | 202 | 20.88 | 786 | 3301.20 | 105 | 27.25 | 27 | 3.06 |
| Diamond | 8.1 | 991 | 78.11 | 237 | 21.89 | 205 | 276.75 | 36 | 7.10 | 42 | 4.18 |
| Cornell Box | 12.4 | 1019 | 171.06 | 9 | 1.55 | 21 | 30.45 | 21 | 6.10 | 4 | 0.73 |
| Sponza | 153 | 1010 | 145.31 | 187 | 33.07 | 304 | 1103.52 | 36 | 11.33 | 31 | 5.44 |
| Clock | 97 | 989 | 179.62 | 33 | 7.30 | 44 | 70.44 | 4 | 5.24 | 16 | 3.69 |
| Sibenik | 251 | 1006 | 288.56 | 173 | 51.14 | 32 | 58.24 | 17 | 12.01 | 99 | 30.61 |
| Conference | 92 | 981 | 283.94 | 36 | 10.59 | 40 | 58.49 | 13 | 6.65 | 17 | 5.19 |

Among them, Benchmark indicates the experiment scenarios including Box, Torus, Diamond, Cornell Box, Sponza, Clock, Sibenik, Conference, totally 8 benchmark for the experiments; Iterations represents the number of iterations used to obtain the results; Times is the time consumption accordingly; MSE represents the mean square error between the synthesized image and the reference image. This table shows that under the specified mean square error value as the metric. The disclosed method often requires fewer iterations, and at the same time, it takes much less time than other methods. In other words, the disclosed method can achieve the same rendering quality as other methods with very little time cost.

The above embodiments are only used to illustrate the technical solution of the present invention but not to limit it. Those skilled in the art can modify or equivalently replace the technical solution of the present invention without departing from the spirit and scope of the present invention. The scope of protection shall be subject to the claims.

What is claimed is:

1. A progressive photon mapping method based on statistical model test includes the following steps:
   1) setting a photon number $k_{NN}$ used to determine the initial photon collection radius, and set a number of photons emitted into the scene for each photon tracing step;
   2) starting from the viewpoint, emitting a ray to each pixel to be calculated on the image plane and intersect the 3D scene to be rendered; if an intersection with a surface with the diffuse reflection properties is found on the tracing path, recording the intersection as a hit point $\vec{x}$; and 3) performing a photon pass:
31) performing the photon tracing step, including simulating the light source emitting photons into the scene, tracing the propagation in the scene of each photon emitted in the current photon pass, and recording the photon that finally locates on a surface of the object along with attributes of the photon, and constructing one or more photon maps based on these recorded photons;
32) for each hit point $\vec{x}$, performing photon collection processing, including collecting the photons in the neighbor from the photon map around the surface where the hit point is located;
33) if the current iteration of photon stage does not need chi-square test, performing flux accumulation and keeping the photon collection radius unchanged; if chi-square test is necessary, performing a chi-square test on a photon distribution collected within the searching area associated with the hit point $\vec{x}$ to obtain photon quality evaluation; computing a photon collection radius based on properties of the photon distribution in the next iteration of photon pass, and performing flux accumulation of the current iteration of photon pass; and
34) determining whether the radius for photon collection has changed or not; if the photon collection radius is reduced, generating a new hit point and perform distributed ray tracing, and then going to step 31) to start a new iteration of photon pass; otherwise, going directly to step 31) to start a new iteration of photon pass, wherein for each iteration of photon pass, a current iteration of rendering results are obtained according to a current accumulated flux for radiance computation.

2. The progressive photon mapping method of claim 1, wherein attributes of a photon include energy carried by the photon, a spatial position where the photon stays, an incident angle on a surface where the photon finally strikes, and the BRDF of the surface.

3. The progressive photon mapping method of claim 1, wherein step of performing distributed ray tracing includes: starting from the viewpoint to each pixel to be calculated on the image plane, emitting a sampled ray with random attributes to intersect with the three-dimensional scene to be rendered; and if an intersection with diffuse reflection properties is found, setting the intersection as the newly generated hit point.

4. The progressive photon mapping method of claim 1, wherein step of performing a chi-square test on a photon distribution collected within the searching area associated with this hit point comprises:
41) assuming a photo collection radius for current iteration to be $R_i$ associated with the hit point $\vec{x}$, partitioning the disk into a series of concentric annuli, where the innermost sub-disk is a degenerate annulus with inner diameter equivalent to 0; The annuli constitute a series of concentric sub-disks from inside outwards, partitioning each annulus further into N sectors, denoted as $\{S_1, \ldots, S_N\}$;
42) counting the number of photons locating on each sector, denoted as $\{Photons(S_1), \ldots, Photons(S_N)\}$; and
43) performing the chi-square test on the number of photons falling into each sub-disk within the current circular photon collection area associated with the hit point $\vec{x}$ is performed from the inside to the outside; suppose a sub-disk C contains a total of Ns(C) sectors, denoted as $\{S_1, \ldots, S_{Ns(C)}\}$, the corresponding sector is labeled as $\{A_1, \ldots, A_{Ns(C)}\}$, and the number of photons falling in the corresponding sector is recorded as $\{Photons(S_1), \ldots, Photons(S_{Ns(C)})\}$, Nc is the total number of photons collected in the current photon pass within the sub-disk C, then the chi-square test of sub-disk C is calculated as $$V(C) = \sum_{i=1}^{Ns(C)} \frac{(Photons(S_i) - N_c p_i)^2}{N_c p_i},$$

where V(C) value represents the photon distribution, $p_i$ is the probability of a photon falling into the i-th sector among the Ns(C) sectors, $p_i = A_i/\pi r^2$, r is the radius of the current sub-disk C, and $Photons(S_i)$ is the number of photons falling into the i-th sector of these Ns(C) sectors; determining whether the photon distribution within the sub-disk C has passed the chi-square test or not according to the value of V(C).

5. The progressive photon mapping method of claim 4, wherein in the step 41), each disk is partitioned into multiple sectors with equal area.

6. The progressive photon mapping method of claim 4, wherein step of computing the photon collection radius in the next iteration of the photon pass comprises: for any sub-disk C from the inside to the outside, defining a quantile of the chi-square test of this disk Quantile(C)=$\lambda$, where $\lambda$ satisfies $\chi_\lambda^2$ (Ns(C)−1)=V(C), the sub-disk with the smallest value of $\lambda$ is considered as the photon distribution within the sub-disk has the closest fit to the uniform distribution, and the corresponding radius is selected as the photo collection radius in the next iteration of photon pass, wherein Quantile (C) also represents the goodness of fit of the photon distribution in sub-disk C with the hypothetical distribution model.

7. The progressive photon mapping method of claim 1, wherein the formula $$\tau_{i+1}(\vec{x}, \vec{\omega}) = (\tau_i(\vec{x}, \vec{\omega}) + \Phi_i(\vec{x}, \vec{\omega})) \frac{R_{i+1}(\vec{x})^2}{R_i(\vec{x})^2}$$

is used to calculate the flux accumulation of the (i+1)-th iteration of photon pass, where $R_{i+1}(\vec{x})$ is the radius of the (i+1)-th iteration collection, $Ri(\vec{x})$ is the i-th iteration collection radius, $\Phi_i(\vec{x}, \vec{\omega})$ is the flux of the photons collected in the i-th photon pass, and $\tau_i(\vec{x}, \vec{\omega})$ is the flux accumulated before the i-th photon pass.

* * * * *